Dec. 2, 1969         J. W. GRAHAM         3,481,401

SELF-BRIDGING FRACTURES

Filed Jan. 25, 1968

JOHN W. GRAHAM INVENTOR.

BY

*Lewis H. Eatherton*

ATTORNEY

United States Patent Office 3,481,401
Patented Dec. 2, 1969

3,481,401
SELF-BRIDGING FRACTURES
John W. Graham, Bellaire, Tex., assignor to Esso
Production Research Company, a corporation of
Delaware
Filed Jan. 25, 1968, Ser. No. 700,634
Int. Cl. E21b 43/27
U.S. Cl. 166—280     12 Claims

ABSTRACT OF THE DISCLOSURE

A method for producing fractures of high fluid conductivity in subterranean formations. The formation is hydraulically fractured and deformable acid-resistant particles are forced into the fracture. The pressure then is reduced sufficiently to cause substantial deformation of the particles and increase the contact area between the particles and the walls of the fracture. Acid is then injected into the fracture which attacks the unprotected portions of the formation. Those portions of the rock matrix which are shielded by the acid-resistant particles remain as pillars or bridges between the fracture walls. These pillars will prevent the fracture from closing and thus will produce highly conductive paths for fluid flow.

BACKGROUND OF THE INVENTION

Field of the invention

This invention is a process for treating a fractured formation surrounding a wellbore. More particularly, the invention is a method for creating channels of high fluid conductivity by dissolving the exposed formation surrounding acid-resistant particles compressed between the walls of a fracture. The portions of the fracture walls which are shielded by the acid-resistant particles remain as pillars which hold the fracture in an open position.

Description of the prior art

Crude oil and natural gas are produced from porous and permeable subterranean formations. The porosity or void space of the formation is a measure of the ability of a formation to store the oil or gas. Permeability is a measure of the fluid conductivity of the formation. Permeability is related to the ability of fluids to move through the pores of the formation and is a necessary and essential requirement for production of the reservoir fluids. Where the natural permeability of a formation is low or operations within a well have damaged the ability of the formation of transmit fluids, the productivity of the well will be reduced. Remedial operations are necessary to increase the permeability in such cases.

Acidizing and fracturing are commonly employed methods for increasing the permeability of the formation. Both are methods for artificially creating channels of high fluid conductivity within the formation. Acidizing is accomplished by contacting the formation with an acid which will chemically react with and dissolve the formation. Acidization is often employed in conjunction with hydraulic fracturing.

Hydraulic fracturing is accomplished by subjecting the formation to high pressure fluid which is pumped down the well and into contact with the formation. This high pressure fluid causes the formation to split along planes of weakness when the yield strength of the formation is exceeded. These fractures are zones of high fluid conductivity and greatly increase the effective permeability of the formation.

When the pressure of the injected fluid is reduced, the fractures will tend to close due to the unbalanced compressive forces which are asserted on the formation. To prevent closure of the fractures, propping agents are commonly emloyed. These propping agents are generally sand, metallic shot, plastic particles, glass beads, or woody materials such as walnut hull fragments and are normally injected with the fracturing fluid to hold the fracture in an open position when fracturing pressure is relieved.

A major problem associated with the use of propping agents in fracturing is due to the difference between the hardness and strength of the formation and the hardness and strength of the propping agent employed. Where the propping agent is much harder and stronger than the formation, it tends to become embedded in the formation when the pressure is reduced. Where the embedding is substantial the fracture will tend to close, thus destroying the effectiveness of the propping agent. Where the propping agent is considerably softer than the formation the propping agent may disintegrate or deform and allow the fracture to close when the pressure is reduced.

SUMMARY OF THE INVENTION

Applicant's invention relates to the use of deformable, acid-resistant particles which are injected into the fracture with or subsequent to injection of the fracturing fluid. These particles will deform when fracturing pressure is relieved and cover a portion of the fracture faces with an acid-resistant coating. Acid is then injected into the fracture and the acid will contact and erode those portions of the formation which are not shielded by the acid-resistant material. Erosion of the fracture faces will create channels of high fluid conductivity between columns of the formation which are partially insulated from acid attack by the acid-resistant material.

DESCRIPTIONS OF THE DRAWINGS

DETAILED DESCRIPTION OF THE INVENTION

In the hydraulic fracturing of the formation a packer either single or dual is run into the well on a tubing string to isolate the formation. The deformable, acid-resistant particles are added to the fracturing fluid and the mixture is pumped into the well. Normally, the surface pressure will rise as fluid is displaced into the formation until the formation ruptures. When the formation ruptures there will generally be a sudden decrease in surface pressure and the pressure will remain relatively constant at this level as the fracture is extended. Injection of the fracturing fluid should be continued until the desired quantity of particles is displaced into the fracture system. Alternatively the particles may be injected in a fluid which displaces the fracturing fluid after the fractures are formed.

Figure 1:
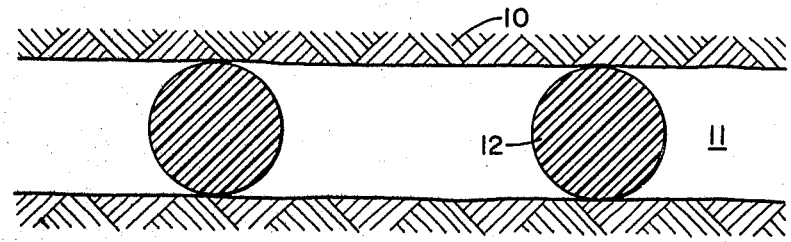
FIGURE 1 is a cross-sectional view of a fracture with two pellets of deformable, acid-resistant material.

Referred to FIGURE 1, the formation 10 is shown after it has been fractured by the application of hydraulic pressure sufficient to overcome the compressive forces on the formation and the tensile strength of the rock. As these forces are overcome the formation ruptures along planes of weakness and fractures 11 are formed. Deformable, acid-resistant particles 12 contained in the fracturing fluid are deposited in the fracture system.

Figure 2:
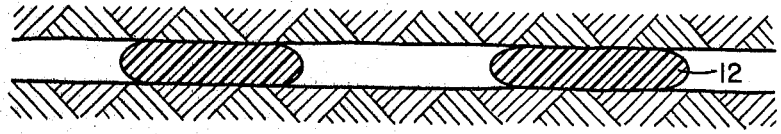
FIGURE 2 shows the fracture after pressure has been partially relieved and the deformable, acid-resistant particles deformed.

Following fracturing and injection of the deformable, acid-resistant particles into the fracture system, the surface pressure should be reduced to permit the fracture system to contract. As contraction of the system occurs, the particles will be contacted by and pinned between the fracture faces. Further reduction in pressure will cause the particles to deform and assume a disc-like shape within the fracture as shown in FIGURE 2. Generally, the surface pressure will automatically begin to decrease when pumping of the fracturing fluid is terminated due to fluid leakoff into the formation. Generally, this will be sufficient to obtain the necessary deformation of the particles. In some instances, however, it may be desirable to reduce the hydrostatic head on the formation by displacement of the fluid in the tubing string to obtain the desired deformation.

The fracture system will not close completely since the deformed particles will hold the fracture in a partially open position. The increased contact area of the deformed particles will increase the load carrying capacity of the particles. Thus if the particle material is properly selected the particles will deform to increase substantially the contact area with the fracture face but will hold the fracture in a partially open position to permit acid injection.

An acidizing solution is then displaced into the fracture system. The injection rate of this solution preferably should not be so high as to cause the fracture system to reopen. However, slight reopening of the fracture system may be tolerated when the particles have some resiliency. Where the permeability of the formation is extremely low, displacement of the acidizing fluid into the formation may take an extended period of time. In those instances, it may be preferable to employ a relatively slower reacting organic acid or a mineral acid with a retarder. Where slowly reacting acids are employed the particles may be injected with the acid solution if desired. It is only necessary that the particles be in position to shield portions of the fracture wall before substantial acid erosion has occurred.

Figure 3:
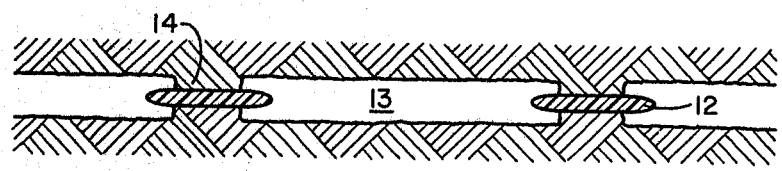
FIGURE 3 shows the fracture following acidization with pillars formed beneath the acid-resistant particles.

The acid will attack the exposed faces of the fracture system but cannot contact the portions of the formation which are protected by the acid-resistant particles. Consequently, as shown in FIGURE 3, large channels 13 of high conductivity of fluids are formed within the fracture system. The protected portions of the fracture faces will not erode and pillars or bridges 14 are left at these locations. The bridges will support the fracture system and prevent closure.

After the acid has been displayed into the fracture system, the well may be shut in and allowed to stand for a period of time ranging from several hours to a day or more. The pressure on the well is then released and the spent acid containing the salts formed by reaction with the formation is permitted to flow back into the wellbore and is pumped to the surface. The well may thereafter be placed on production or used for other purposes.

In the the practice of this invention, particles made of acid-resistant materials are employed. An acid-resistant material is one which is chemically inert to the particular acid employed or which is so slowly attacked by the acid that less than one-half of the particle will be dissolved after several hours exposure to an acid solution of the strength to be used and at reservoir temperature and fracturing pressure. It is important that the particle itself be resistant to acid attack. Coating particles which are not acid-resistant with an acid-resistant covering is not entirely satisfactory. The particles are subjected to extreme pressures during deformation and the velocity of fluid within the fracture may be appreciable at times. If the particle is merely coated with rather than composed of the acid-resistant material, there may be a tendency for the coating to erode and for the acid to attack the particle prematurely.

The choice of the composition of the particle may vary with the choice of acid. The properties of the formation to be acidized will govern to a large extent the choice of acid. For a calcareous formation such as limestone or dolomite, hydrochloric acid is commonly employed. Where the formation is a silicate such as a sandstone, hydrofluoric acid or mixture of hydrofluoric acid and hydrochloric acid may be used. Organic acids such as formic, acetic, hydroxyacetic, chloroacetic, succinic, propinonic, butyric, lactic, oxalic, maleic, dichloroacetic, citric, and chloropropionic acids singly or in combination are employed for acidizing both calcareous and some siliceous formations. Arsenic and cyanide compounds may be employed as inhibitors with the acid solutions to prevent corrosion of the metal surfaces of the well equipment by the acid. Other additives such as buffering agents to retard the action of the acid on the formation, de-emulsifiers, and gel preventers may also be used in the acid solution.

It will be readily apparent that certain materials will be acid-resistant as that term is used herein for certain acids and not for other acids. Thus nylon is acid-resistant with respect to the mineral acids, hydrochloric and hydrofluoric, but is not suitable for use with most of the organic acids. Polytetrafluoroethylene exhibits excellent resistance from attack by both mineral and organic acids. Natural woody materials are generally unsuitable for the practice of this invention due to the low resistance to acid attack by such materials at the pressures employed in acidizing subterranean formations and the extreme temperatures sometimes encountered at depths beneath the earth's surface. Moreover, such materials are generally extremely friable and will disintegrate as the fracture closes resulting in poor shielding of the fracture wall.

Where the resistance of a particular material to corrosive attack by a particular acid is not readily available in published literature, this can be easily determined by utilizing well-known laboratory techniques. One such method is the Standard Static Corrosion Test, Perry, "Chemical Engineers Handbook," third edition, McGraw-Hill, pp. 1458–1460. This test procedure may be modified to determine the effect of pressure on the corrosive attack of the acid solution on the material by carrying out the test in a pressure vessel. The effect of reservoir temperature may be determined by heating the pressure vessel.

The density of the particles will preferably approximate the density of the carrying fluid. Where water is employed as the carrying fluid, the density of the particles should be from 0.8 to 1.2 g./cc. When the densities of the particle and fluid are approximately equal, there will be little tendency for gravity segregation of the particles in a vertical fracture and there will be a more uniform distribution of the particles within the fracture system. When relatively dense materials such as lead pellets are employed as the deformable, acid-resistant particles, the tendency for gravity segregation can be partially offset by employing a relatively viscous carrying fluid.

The material used to make the particles employed in the practice of this invention should be both deformable and resistant to compressive failure. In some instances it may be preferred to employ particles which also are resilient. If the particles are resilient they will remain in contact with the fracture walls even if there is a slight reopening of the fracture system. As used herein the property of deformability means the ability of a particle to deform to at least twice and preferably up to ten times its original diameter upon application of compressive forces asserted on the particle by the fracture faces. The resistance to compressive failure of the particle should be sufficiently high so that the particles retain at least one percent and preferably ten percent of their original diameters in a line perpendicular to the fracture face when fully compressed. A particle is resilient as used herein if after compression to one-half its original diameter it will expand to at least sixty percent of its original diameter when compression is released.

In an alternative embodiment, the particles may be made of dissimilar materials such as an outer casing of an easily deformed material such as a soft polyolefin with a small diameter, relatively hard, inner core such as a polyolefin having a high yield strength. The outer casing will deform upon compression to contact and protect the fracture face and the hard inner core will provide satisfactory separation of the walls during acidizing.

In another embodiment a mixture of easily deformable particles and separate high yield strength particles may be employed. The high yield strength particles should have a diameter which is approximately one-quarter to one-tenth the diameter of the deformable particles. As the compressive load is applied to the deformable particles they will increase their contact with the fracture face as they are compressed in the fracture. The high yield strength particles will prevent closure of the fracture and give a satisfactory passage for the introduction of the acidizing solution. Suitable mixtures would include easily deformable polyolefins and small diameter sand particles or easily deformable polyolefins and high yield strength, small diameter, polyolefin particles.

The acid-resistant particles may be of any conventional shape or form. The particles may be spherical to permit easy transportation through fluid system in pumps, passage through perforations in the casing and entry into the fracture. However, it should be recognized by one skilled in the art that the shape of the particles is not critical to the practice of the invention and particles such as platelets, rods, cylinders or cubes may be employed if desired.

Any material which is acid resistant and sufficiently deformable is suitable for the practice of this invention. Among the suitable materials would be paraffin wax, lead pellets, and thermoplastic and thermosetting resins such as polyethylene, polytetrafluoroethylene, polypropylene, epoxy resins, and silicon rubber. Silicon rubber and similar elastomers can be particularly useful due to the resilient properties of these materials. Specific examples of some suitable materials are a high density polyethylene having a specific gravity of 0.96, sold under the trade name "Marlex" by Phillips Petroleum Company, a low density polyethylene having a specific gravity of 0.92, sold under the trade name "Petrothene" by National Distillers and Chemical Corporation, and a crystalline polypropylene having a specific gravity of 0.91, sold under the trade name "Enjay Polypropylene" by Enjay Chemical Company. It is only necessary that the particle be resistant to the particular acid being used for acidulation of the rock matrix and sufficiently deformable under the pressure applied when the fracture closes to contact and shield a substantial portion of the fracture face. Since the compressive forces acting on the particles can be estimated in any given situation a particle material may be chosen which will deform sufficiently to cover a desired area of the fracture face and yet retain sufficient thickness to prevent closure of the fracture when the pressure is reduced.

The quantity and size of particles should be chosen to give less than a complete monolayer of the particles within the fracture system after deformation. The expected size of the fracture system can be readily estimated by means known to those skilled in the art and the degree of deformation of the particles can also be readily calculated. Preferably the particles should contact no more than seventy-five percent of the fracture face after deformation to permit acid attack on a substantial portion of the fracture walls. However, to provide sufficient support to prevent collapse of the bridges at least ten percent of the fracture face should be insulated from acid attack. Thus it is preferred to inject sufficient particles to contact from ten percent to seventy-five percent of the fracture face.

Particle sizes ranging from 3 to 60 mesh are preferred in the practice of this invention.

Surprisingly good results have been obtained in experimental tests of the method. In one test, pellets of "Petrothene" polyethylene were placed in a compression tester and subjected to a deformation pressure of 1000 p.s.i. to approximate deformation within a fracture system. The pellets were originally cubical with sides of 3.0 mm. After deformation, the pellets were circular with a diameter of approximately 10 mm. and a thickness of 0.4 mm. The deformed pellets were placed between two blocks of Leuder's limestone which is an outcrop limestone from the midwestern United States. The blocks were clamped to hold the pellets in position and a protective coating of stopcock grease was applied to the exterior of the blocks. A 37.4% hydrochloric acid solution was then flushed through the separation between the blocks which contained the deformed pellets. After subjecting the blocks to acidization for three minutes, the blocks were rinsed in water. The separation between the blocks had been radically increased. The original separation of 0.4 mm. had been increased to approximately 9 mm. The uneroded pillars were well defined with sloping sides.

While this invention has been described for reasons of convenience in terms of creating channels of high fluid conductivity in oil or gas producing formations, the invention is useful in the creation of such channels in a variety of operations. The method is equally useful in increasing the productivity of water wells or in increasing the injectivity in wells for water or gas injection or the disposal of fluids. In addition while in many operations the method will be employed in conjunction with fracturing of the formation, the step of fracturing is not essential to performance of the method. In many instances the formation may be naturally fractured and this method may be employed to increase the fluid conductivity of the naturally occurring fractures.

What is claimed is:

1. A method for creating channels of high fluid conductivity in a subterranean formation penetrated by a wellbore comprising:
   (a) injecting deformable, acid-resistant, solid particles into a fracture in the formation;
   (b) permitting the fracture to at least partially close to deform the particles and to shield the fracture wall against acid attack only at those points where the fracture walls are contacted by the particles; and
   (c) injecting acid into the fracture to acidize that portion of the fracture face which is not contacted by the acid-resistant particles to create pillars at the position of the acid-resistant particles and channels of high fluid conductivity between the pillars.

2. The method as defined in claim 1 wherein the particles have a relatively hard inner core and a relatively soft outer covering.

3. The method as defined in claim 1 wherein the particles are a mixture of relatively soft large, particles and relatively hard, small particles.

4. The method as defined in claim 1 wherein the particle size is within the range of from about 3 to about 60 mesh.

5. The method as defined in claim 1 wherein the particles are substantially a plastic solid.

6. The method as defined in claim 6 wherein the particles are substantially a thermoplastic resin.

7. The method as defined in claim 6 wherein the particles are substantially a thermosetting resin.

8. The method as defined in claim 1 wherein the particles are dispersed in a fluid used to fracture the formation.

9. The method as defined in claim 1 wherein the particles are dispersed in a fluid which is used to displace a fluid used to fracture the formation.

10. The method as defined in claim 1 wherein the deformable particles of an acid-resistant material are resilient.

11. The method as defined in claim 1 wherein the particles are dispersed in the acid which is injected into the fracture.

12. The method as defined in claim 1 wherein the particles are suspended in a carrying fluid which has a density which is approximately equal to the density of the particles.

References Cited
UNITED STATES PATENTS

| | | | |
|---|---|---|---|
| 3,237,693 | 3/1966 | Huitt et al. | 166—42.1 |
| 3,239,006 | 3/1966 | Fast | 166—42.1 |
| 3,242,988 | 3/1966 | McGuire et al. | 166—42.1 |
| 3,266,573 | 8/1966 | Bixe | 166—42.1 |
| 3,285,340 | 11/1966 | Huitt et al. | 166—42.1 |
| 3,376,930 | 4/1968 | Kiel et al. | 166—42.1 |
| 3,387,888 | 6/1968 | Shock et al. | 166—42.1 |

JAMES A. LEPPINK, Primary Examiner

U.S. Cl. X.R.

166—307